(12) United States Patent
Kaikogi et al.

(10) Patent No.: US 8,602,654 B2
(45) Date of Patent: Dec. 10, 2013

(54) BEARING TEMPERATURE MONITORING DEVICE AND BEARING DEVICE PROVIDED WITH THE MONITORING DEVICE

(75) Inventors: Takaaki Kaikogi, Hyogo (JP); Kazuhiko Yamashita, Hyogo (JP); Takashi Nakano, Tokyo (JP); Yuichiro Waki, Tokyo (JP); Motohisa Uesato, Aichi (JP); Yutaka Yamada, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 578 days.

(21) Appl. No.: 12/308,555

(22) PCT Filed: Oct. 31, 2007

(86) PCT No.: PCT/JP2007/071595
§ 371 (c)(1),
(2), (4) Date: Mar. 5, 2009

(87) PCT Pub. No.: WO2008/054019
PCT Pub. Date: May 8, 2008

(65) Prior Publication Data
US 2010/0239204 A1 Sep. 23, 2010

(30) Foreign Application Priority Data
Nov. 2, 2006 (JP) .................. 2006-299540

(51) Int. Cl.
*F16C 32/00* (2006.01)
(52) U.S. Cl.
USPC ....................... 384/448; 340/870.17
(58) Field of Classification Search
USPC .............. 384/278, 448; 116/218; 340/870.17; 374/153
See application file for complete search history.

(56) References Cited

U.S. PATENT DOCUMENTS

| 3,824,579 A | * | 7/1974 | Waseleski et al. ............ 384/624 |
| 4,721,399 A | | 1/1988 | Grosskurth et al. |

(Continued)

FOREIGN PATENT DOCUMENTS

| EP | 0 167 744 | 1/1986 |
| JP | 60-252819 | 12/1985 |

(Continued)

OTHER PUBLICATIONS

International Search Report mailed Feb. 12, 2008 for International Application No. PCT/JP2007/071595.

(Continued)

*Primary Examiner* — Michael P Ferguson
(74) *Attorney, Agent, or Firm* — Wenderoth, Lind & Ponack, L.L.P.

(57) ABSTRACT

A bearing temperature monitoring device and bearing device provided with the monitoring device composed so that occurrence of scratch on the rotation shaft supported by the bearing caused by a bearing temperature carrying member integrated in the bearing such that its top end surface faces the rotation shaft, are provided. The bearing device is provided with a bearing temperature detecting device which comprises a bearing temperature carrying member made of material larger in thermal conductivity than the bearing layer and shaped to have a protruded part to be inserted slidably into a through hole in the bearing layer and a base part to be received in a cylindrical space in the back metal, the base part serving to restrict protrusion of the protruded part into the through hole so that the top end surface thereof is level with the sliding surface of the bearing layer, a pushing member attached to the back metal to push the temperature carrying member so that the member move toward the back metal against the pushing force of the pushing member when bearing load exerts on the temperature carrying member, and a temperature sensor for detecting temperature of the temperature carrying member.

19 Claims, 8 Drawing Sheets

(56) References Cited

U.S. PATENT DOCUMENTS

| | | | |
|---|---|---|---|
| 5,129,743 A * | 7/1992 | Faye et al. | 384/448 |
| 6,512,365 B1 * | 1/2003 | Karpinski | 384/448 |
| 2003/0091253 A1 * | 5/2003 | Morita et al. | 384/448 |
| 2003/0147572 A1 * | 8/2003 | Message et al. | 384/448 |
| 2006/0165335 A1 | 7/2006 | Yoshimura et al. | |

FOREIGN PATENT DOCUMENTS

| | | | |
|---|---|---|---|
| JP | 60-256023 | | 12/1985 |
| JP | 63-289313 | | 11/1988 |
| JP | 4-4313 | * | 1/1992 |
| JP | 2006-112602 | | 4/2006 |

OTHER PUBLICATIONS

Notification of Transmittal of Translation of the International Preliminary Report on Patentability issued Jun. 4, 2009 in corresponding International Application No. PCT/JP2007/071595.

Notification Concerning Transmittal of International Preliminary Report on Patentability issued May 14, 2009 in corresponding International Application No. PCT/JP2007/071595.

Japanese Notice of Allowance (and English translation) issued Mar. 29, 2012 in corresponding Japanese Application No. 2006-299540.

* cited by examiner

BEARING TEMPERATURE MONITORING DEVICE AND BEARING DEVICE PROVIDED WITH THE MONITORING DEVICE

TECHNICAL FIELD

The present invention relates to a bearing monitoring device for monitoring temperature of a bearing composed of a back metal and a bearing layer of resin material adhered to the inside face of the back metal and a bearing device provided with the monitoring device.

BACKGROUND ART

Bearings each composed of a back metal and a bearing layer of resin material adhered to the inside face of the back metal (here inside face means the load supporting side face or inner circumferential face of the bearing) are adopted in machines such as steam turbines, gas turbines, etc. as radial journal bearings and thrust bearings for supporting shafts rotating at high speed.

The bearing layer of resin material is lower in heat conductivity as compared with bearing layer of cupper alloy such as white metal, etc., and heat generation in bearings of rapidly rotating shafts is severe, so temperature rise in such bearings is significant owing to large amount heat generation and low heat conductivity. Therefore, it is required to operate the machines while monitoring bearing temperature.

A bearing composed of a bearing layer of resin material and a back metal to which the bearing layer is adhered and provided with a bearing temperature measuring device is disclosed in document 1(Japanese Laid-Open Patent Application No. 2006-112602).

Figure 9:
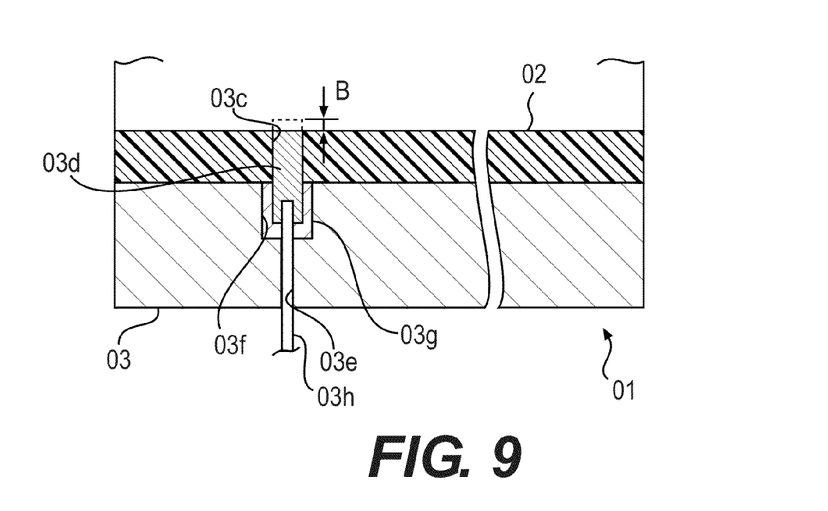
FIG. 9 is a partial longitudinal cross-section of a radial bearing showing a bearing temperature detection portion of the prior art.

FIG. 9 is a partial longitudinal cross-section of a radial bearing showing a bearing temperature detection portion disclosed in the document 1.

As shown in FIG. 9, the radial bearing 01 has the bearing layer 02 of resin material adhered to the inside face of the back metal 03. The bearing 01 is provided at the bearing temperature detection portion with a heat insulating member 03g fit into a hole 03f having a bottom bored into the back metal 03, a metal piece 03d for sensing temperature which is fit into a through hole 03c bored into the bearing layer 02 so that its top end face is level with the sliding surface of the bearing layer 02, and a temperature detector 03h which is connected to the temperature measuring metal piece 03d and extends through a through hole 03e bored into the back metal 03 to be connected to a temperature instrument not shown in the drawing.

Temperature of the temperature measuring metal piece 03d is detected by the temperature detector 03h as the temperature of the bearing material 02.

In the bearing shown in FIG. 9, the temperature measuring metal piece 03d is fit into the through hole in the bearing layer of resin material such that the top end face of the temperature measuring metal piece is level with the sliding surface of the bearing layer 02 on which bearing load is supported, and this prior art has a disadvantage as follows.

Young's modulus of the resin material of the bearing layer 02 is smaller than that of cupper alloy such as white metal (Young's modulus of white metal is about 52 GPa, whereas that of resin is about 13 GPa). Therefore, compressive deformation due to bearing load exerting from the rotating shaft is larger in the case of the bearing layer as compared with the case cupper alloy such as white metal is adopted as such bearing layer.

With the prior art as shown in FIG. 9, as the temperature measuring metal piece 03d is tightly fitted with the bearing layer 02 so that its top end face is level with the sliding surface of the bearing layer 02, such a state occurs that the temperature measuring metal piece 03d protrudes from the bearing layer 02 toward the rotation shaft when compressive deformation increase due to increased bearing becomes large, and the rotation shaft is scratched by the protruded metal piece, resulting in decreased load bearing capacity, and also may be resulting in occurrence of damage to the rotation shaft.

SUMMARY OF THE INVENTION

The present invention was made in light of the problems of the prior art, and the object of the invention is to provide a bearing temperature monitoring device of a bearing composed of a bearing layer of resin material and a back metal to which the bearing layer is adhered, with the device the bearing temperature carrying member made of metal of which the top end surface faces the surface of the rotation shaft supported by the bearing does not cause to scratch the surface of the rotation shaft by composing such that protrusion of the top end surface of the bearing temperature carrying member from the sliding surface of the bearing layer is prevented and as a result occurrence of decrease in load bearing capacity and occurrence of damage to the rotation shaft can be prevented resulting in increased reliability, and a bearing device provided with the monitoring device.

To attain the object, the present invention proposes a bearing temperature monitoring device for monitoring bearing temperature of a bearing composed of a bearing layer of resin material and a back metal to which the bearing layer is adhered, wherein a cylindrical space for accommodating parts constituting a bearing temperature detecting device is provided in the back metal, a through hole is drilled to penetrate the bearing layer to be connected to the cylindrical space in the back metal, wherein the parts constituting the bearing temperature detecting device includes: a bearing temperature carrying member made of material having a coefficient of thermal conductivity larger than that of the bearing layer and shaped to have a protruded part to be inserted slidably into the through hole in the bearing layer and a base part to be received in the cylindrical space in the back metal, the base part serving to restrict protrusion of the protruded part into the through hole so that the top end surface thereof is level with, not protrudes from the surface of the bearing layer; a pushing member which is attached to the back metal to push the bearing temperature carrying member so that the protruded part thereof protrudes into the through hole in the bearing layer until the protrusion is restricted by the base member thereof and shrinks to allow the bearing temperature carrying member to move toward the back metal against the elastic force of the pushing member when bearing load exerts on the bearing temperature carrying member; and a temperature sensing member for detecting temperature of the bearing temperature carrying member.

It is preferable that the device is provided with a bearing temperature processing device for calculating bearing temperature by processing an electric signal of temperature detected by the temperature sensing member, a display unit for displaying the temperature calculated by the bearing temperature processing device, and an alarm device for raising alarm when the calculated bearing temperature exceeds a prescribed permissible temperature.

According to the invention, when the sliding surface of the bearing layer of resin material which is smaller in Young's modulus as compared with bearing layer of cupper alloy such as white metal is compressed by the bearing load exerting from the rotation shaft supported by the bearing and deformed radially toward the back metal, the bearing temperature carrying member of which the temperature represents or nearly represent bearing temperature is pushed by the bearing load and moves toward the back metal concurrent with the radial deformation of the sliding surface of the bearing layer against elastic force of the pushing member, so the top end surface of the bearing temperature carrying member is always level with the sliding surface of the bearing layer deformed toward the back metal by bearing load.

Therefore, a state that the top end surface of the bearing temperature carrying member protrudes from the sliding surface of the bearing layer when the sliding surface is deformed toward the back metal by bearing load does not occur, and there is no fear that the rotation shaft is scratched with the bearing temperature carrying member, as a result occurrence of decrease in load bearing capacity and occurrence of damage to the rotation shaft can be prevented.

As detected bearing temperature is displayed on the display unit and warning is raised by the alarm device when the bearing temperature exceeds the prescribed permissible temperature, bearing temperature can be always monitored and excessive rise of bearing temperature can be prevented.

In the invention, the device is preferably composed such that:

(1) The through hole in the bearing layer is smaller in diameter than the cylindrical space in the back metal so that a flat step is formed between the through hole in the bearing layer and the cylindrical space in the back metal, and the bearing temperature carrying member is shaped to be a stepped solid cylinder having a cylindrical protruded part and a cylindrical base part larger in diameter than that of the protruded part so that the protruded part is inserted slidably into the through hole in the bearing layer and the base part is received in the cylindrical space in the back metal so that protrusion of the protruded part into the through hole is restricted by the base part by abutting of the base part on the flat step between the through hole in the bearing layer and the cylindrical space, and wherein the pushing member is composed of a spring member located in the cylindrical space in the back metal in order to push the bearing temperature carrying member and a cover member for supporting the spring member while covering the cylindrical space in the back metal.

With the construction, initial load to push the bearing temperature carrying member toward the sliding surface of the bearing layer can be easily and accurately by using the spring as an energizing member.

It is preferable that a through hole is drilled to the bearing temperature carrying member to penetrate from the top end surface of the protruded part thereof to the bottom end face of the base part thereof for the purpose of balancing pressure exerting on the bearing temperature carrying member.

With this, oil on the sliding surface of the bearing layer can be easily conduced to the back side of the bearing temperature carrying member via the through hole, and downward force and upward force exerting on the bearing temperature carrying member can be balanced rapidly when bearing load exerting from the top end surface of the nearing temperature carrying member, so clearances between the bearing temperature carrying member, bearing layer, and back metal can be adjusted easily without influenced by oil film pressure in the bearing.

(2) The cylindrical space in the back metal is shaped such that its ends in the back metal does not reach the bearing layer leaving an annular protrusion of the back metal adjacent the bearing layer to form a through hole in the back metal which continues to the through hole in the bearing layer, the through hole being smaller in diameter than the cylindrical space so that a flat step is formed between the through hole in the back metal and the cylindrical space in the back metal, and the bearing temperature carrying member is shaped to be a stepped solid cylinder having a cylindrical protruded part and a cylindrical base part larger in diameter than that of the protruded part so that the protruded part is inserted slidably into the through hole in the bearing layer and the base part is received in the cylindrical space in the back metal so that protrusion of the protruded part into the through hole is restricted by the base part by abutting of the base part on the flat step between the through hole in the back metal and the cylindrical space in the back metal, and wherein the pushing member is composed of a spring member located in the cylindrical space in the back metal in order to push the bearing temperature carrying member and a cover member for supporting the spring member while covering the cylindrical space in the back metal.

With the construction, energizing force of the spring to push the temperature carrying member toward the sliding surface of the bearing layer is supported by the annular protrusion of the back metal, deformation of the surface of bearing layer which may occur due to the energizing force of the spring in the case the energizing force of the spring supported directly by the bearing layer. Therefore, occurrence of trouble in lubrication of the rotation shaft due to occurrence of irregularity on the surface of the bearing layer can be prevented.

(3) The bearing temperature carrying member is shaped to be a stepped solid cylinder having the cylindrical protruded part and a cylindrical base part larger in diameter than that of the protruded part so that protrusion of the protruded part into the through hole is restricted by the base part by abutting of the base part on the flat step between the through hole in the bearing layer and the cylindrical space in the back metal or on the through hole in the back metal and the cylindrical space in the back metal, and wherein the outer periphery of base part of the bearing temperature carrying member is coated with heat insulating material in order to suppress heat transfer from the temperature carrying member to the back metal.

By coating the outer periphery of base part of the bearing temperature carrying member, transfer of heat from the outer periphery to the back metal is prevented or reduced substantially, and decrease in temperature of the bearing temperature carrying member as compared with the temperature of the bearing layer due to the heat dissipation from the temperature carrying member to the back metal is suppressed, and temperature of the bearing temperature carrying member can be maintained at substantially the same as that of the bearing layer, which means bearing temperature can be detected more accurately.

Further, it is preferable that the bearing temperature detecting device is composed as a cartridge-type temperature detecting unit so that it is easily attached detachably to the back metal, the unit comprising a substantially cylindrical case made of heat insulating material in which the base part of the bearing temperature carrying member is received with its protruded part protruded from a through hole at the top of the case, and a spring located inside the case to energize the bearing temperature carrying member to allow the protruded part to protrude from the through hole; and the unit being attached to the back metal such that the protruded part of the bearing temperature carrying member protrude into the through hole in the bearing layer.

According to the invention, by composing the bearing temperature detecting device as a cartridge-type unit having the base part of the bearing temperature carrying member received in the case made of heat insulating material, heat dissipation from the bearing temperature carrying member to the back metal is suppressed more effectively, and temperature of the bearing temperature carrying member can be maintained at substantially the same as that of the bearing layer, which means bearing temperature can be detected more accurately. Moreover, as the cartridge-type unit can be attached as a bearing temperature measuring unit detachably to the back metal, assembling and disassembling of the bearing temperature measuring device can be facilitated.

It is also preferable that the bearing temperature carrying member is shaped to be a stepped solid cylinder having a cylindrical protruded part and a cylindrical base part larger in diameter than that of the protruded part so that the protruded part is inserted slidably into the through hole in the bearing layer and the base part is received in the cylindrical space in the back metal, wherein the pushing member is shaped to be a substantially cylindrical elastic sleeve of which the lower end which is formed into a flange is fixed to the back metal so that the upper end of the elastic sleeve pushes the bearing temperature carrying member with elastic force due to compression deformation of the elastic sleeve when it is fixed to the back metal and the bearing temperature carrying member can move toward the back metal against the elastic force when bearing load exerts on the top end surface of the protruded part of the bearing temperature carrying member, and wherein the temperature sensing member is inserted in the hollow of the substantially cylindrical sleeve.

According to the invention, the temperature sensing member is provided independently of the bearing temperature carrying member and the cylindrical sleeve, and radial movement of the bearing temperature carrying member toward the back metal is enabled by elastic compression deformation of the cylindrical elastic sleeve, so space for mounting the temperature sensing member can be increased, and a general-purpose thermocouple can be used, replacement of the thermocouple is achieved with facility, and manufacturing cost of the device can be reduced.

It is also preferable that a hole having a bottom is bored into the bearing temperature carrying member from a surface contrary to the top end surface thereof so that the bottom of the hole reaches near the top end surface and the temperature sensing member is inserted into the hole.

With the construction, the sensing end of the temperature sensing member is positioned nearer to the top end surface of the bearing temperature carrying member, so bearing temperature can be detected more accurately.

The present invention is featured in composing a bearing device provided with the aforementioned bearing temperature monitoring device. According to the invention, a bearing device provided with a bearing temperature monitoring device increased in reliability.

According to the invention, the top end surface of the bearing temperature carrying member moves toward the back metal together with the compressive deformation of the sliding surface of the bearing layer caused by increased bearing load so that the top end surface of the bearing temperature carrying member does not protrude from the sliding surface of the bearing layer. Therefore, fear of occurrence of scratch on the surface of the rotation shaft due to protruded top end face of the bearing temperature carrying member, which will result in decreased load bearing capacity and also may result in occurrence of damage to the rotation shaft, can be eliminated.

Moreover, as bearing temperature is displayed on the display unit and alarm is raised when bearing temperature exceeds a prescribed permissible temperature, bearing temperature is always monitored so that it is in the permissible temperature range and excessive rise of bearing temperature can be prevented.

As has been described heretofore, a bearing temperature monitoring device and a bearing device provided with the monitoring device can be provided according to the invention. By applying the invention particularly to radial bearings for supporting high-speed rotation shafts of steam turbines and gas turbines via oil film, a practical effective result is obtained that excessive rise of bearing temperature can be prevented.

DETAILED DESCRIPTION OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 8:
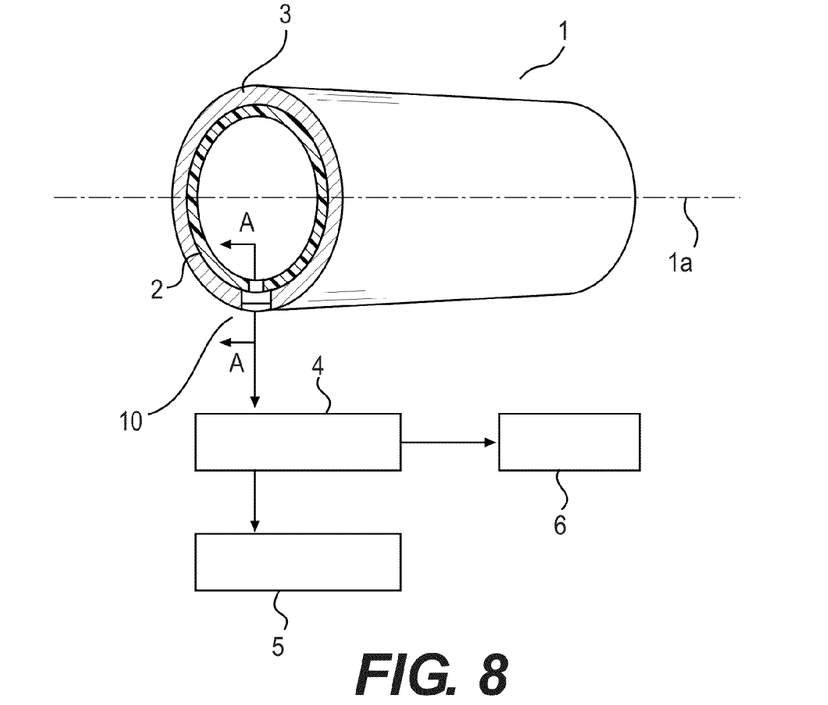
FIG. 8 is a schematic representation of over all configuration of the bearing temperature monitoring device according to the invention.

FIG. 8 is a schematic representation of over all configuration of the bearing temperature monitoring device according to the invention.

Referring to FIG. 8, reference numeral 1 is a radial bearing composed of a back metal 3 made of steel and a bearing layer 2 made of resin material adhered to the inner periphery of the back metal 3. A rotation shaft not shown in the drawing penetrates the hollow of the bearing 1 to be supported on the surface of the bearing layer 2. Reference numeral 1a is a center line of the bearing, center of axle of the rotation shaft.

Reference numeral 10 is a bearing temperature detecting device detailed later, 4 is a bearing temperature processing device, 5 is a display unit, and 6 is an alarm device. Bearing temperature detected by the bearing temperature detecting device 10 is inputted as an electric signal to the bearing temperature processing device 4, the electric signal is processed to obtain bearing temperature in the bearing temperature processing device 4, and the bearing temperature obtained in the device 4 is displayed on the display unit 5.

When the bearing temperature obtained in the device 4 exceeds a permissible limit value, alarm is sounded by the alarm device 6.

[The First Embodiment]

Figure 1:
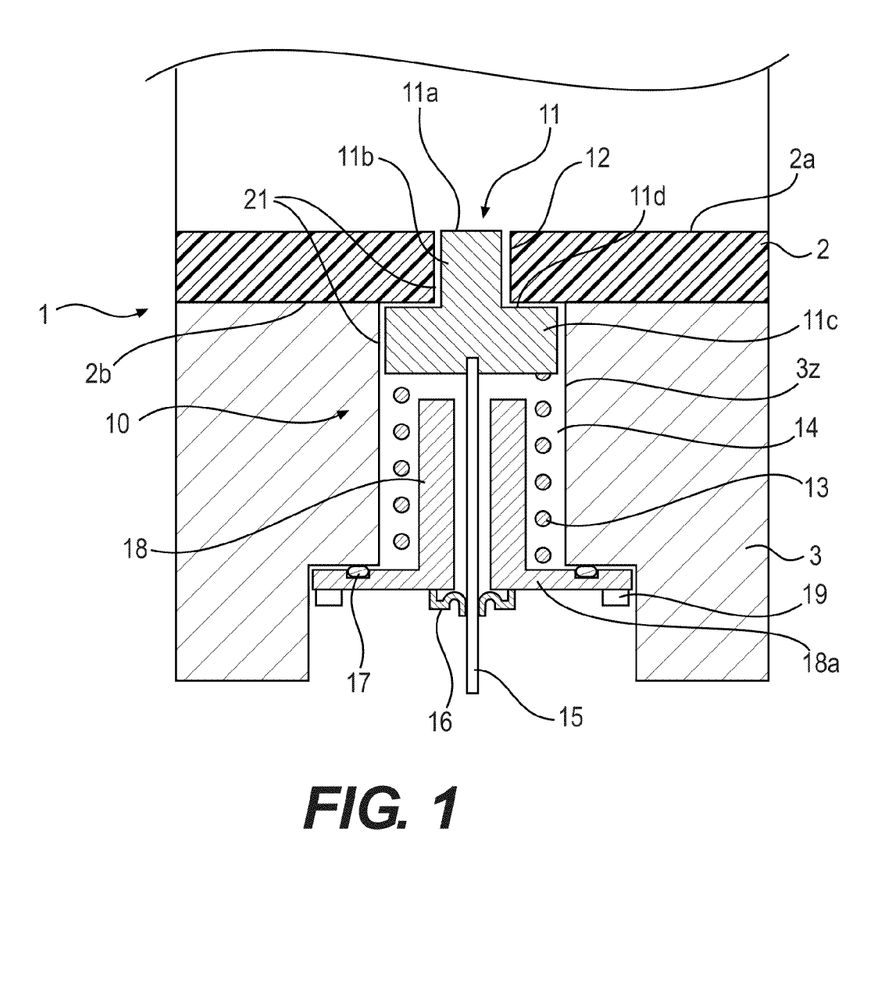
FIG. 1 is a partial longitudinal cross-section of a radial bearing device showing a bearing temperature detection portion of a first embodiment according to the invention (cross view along line A-A in FIG. 8).

FIG. 1 is a partial longitudinal cross-section of a radial bearing device showing a bearing temperature detection portion of a first embodiment according to the invention (cross sectional view along line A-A in FIG. 8).

Referring to FIG. 1, reference numeral 3 is a back metal made of steel, 2 is a bearing layer of resin material and adhered to the inside face of the back metal 3. Reference numeral 12 is a hole for receiving a protruded part 11b of a bearing temperature carrying member 11 which is detailed later, and the hole 12 being bored to penetrate the bearing layer 2 from its sliding surface 2a to its outside face 2b which is adhering to the inside face of the back metal 3. Reference numeral 3z is a hole bored to penetrate the back metal 3 from its inside face to its outside surface to receive a base part 11c for restricting protrusion of the protruded part 11b of the bearing temperature carrying member 11, a spring, etc which are detailed later.

Reference numeral 10 is a bearing temperature detecting device constituted as follows.

The bearing temperature carrying member 11 is made of material such as white metal and steel which has heat conductivity larger than the bearing layer 2. The bearing temperature carrying member 11 is formed to have a protruded part 11b which is a cylindrical part to be inserted into the through hole 12 of the bearing layer 2 and the base part 11c which is a cylindrical part to be received in the hole 3z, the diameter of the protruded part 11b being smaller than that of the base part 11c. Reference numeral 11a indicates a top end surface of the protruded part 11b.

Protrusion of the protruded part 11b of the bearing temperature carrying member 11 from the outside face 2b of the bearing layer 2 toward the sliding surface 2a thereof is restricted by allowing the shoulder 11d of the bearing temperature carrying member 11 to abut on the outside surface 2b of the bearing layer 2 such that the top end surface 11a does not protrude from the sliding surface 2a of the bearing layer 2.

Reference numeral 14 is a spring room in the hole 3z, and a coil spring 13 is accommodated in the spring room 14. Reference numeral 18 is a cover member to cover the spring room 14. The cover member 18 is formed to have a circular cylindrical part on a circular flange part 18a. The flange part 18a of the cover member 18 is fixed to the back metal 3 by a plurality of bolts 19 with the cylindrical part inserted into the hole 3z. The coil spring 13 is compressed by fixing the flange part 18a to the back metal to push the bearing temperature carrying member 11 by its spring force. The shoulder 11d is brought to contact against the back side face of the bearing layer 2 by the spring force. Dimensions of the spring and related parts are determined to push the bearing temperature carrying member 11 onto the back side face of the bearing layer with a certain constant force. Reference numeral 17 is an "O" ring to seal the spring room 14.

Reference numeral 15 is a thermocouple connected to the bearing temperature carrying member 11 to detect the temperature of the bearing temperature carrying member 11, the temperature being deemed to represent bearing temperature. The thermocouple 15 passes through the hollow of the cylindrical part of the cover member 18 to be connected to a temperature instrument not shown in the drawing. Reference numeral 16 is a diaphragm seal for sealing the outer periphery of the thermocouple wire.

A minute clearance 21 is formed between the outer periphery of the protruded part 11b and the inner periphery of the through hole 12 and between the outer periphery of base part 11c and the inner periphery of the hole 3z. The oil on the inside face of the bearing layer 2 is communicated via the minute clearances 21 to the spring room 14, and oil pressure exerting on the bearing temperature carrying member 11 is balanced. Therefore, only small spring force of the spring 13 is needed to energize the bearing temperature carrying member 11 toward the inside of the bearing layer 2.

With the construction, movement of the bearing temperature carrying member 11 to upward, i.e. toward the inside of the bearing layer 2 is restricted such that the top end surface 11a of the bearing temperature carrying member 11 does not protrude from the sliding surface 2a of the bearing layer 2, on the other hand, the bearing temperature carrying member 11 can be moved toward the back metal 3 against the spring force of the spring 13.

According to the first embodiment, when the bearing layer 2 which is smaller in Young's modulus than a bearing layer made of cupper alloy such as white metal is compressed by bearing load in the radial direction and the sliding surface 2a of bearing layer 2 is deformed toward the back metal 3 with the bearing layer being reduced in radial thickness, the top end surface 11a of the bearing temperature carrying member 11 is pushed concurrently toward the back metal 3 against the spring force of the spring 13 by the bearing load exerting from the rotation shaft such that the top end surface 11a is level with the deformed sliding surface 2a.

Therefore, even when compressive deformation of the bearing layer 2 increases with increased bearing load exerting from the rotation shaft, the bearing temperature carrying member 11 is moved down by the bearing load so the top end face 11a thereof is level with the sliding surface of the deformed bearing layer 2, there does not occur a state the top end face 11a protrude from the sliding surface 2a of the bearing layer 2. Accordingly, occurrence of scratching on the rotation shaft by the edge of top end 11b which may occur with the prior art resulting in decreased load bearing capacity and also resulting in occurrence of damage to the rotation shaft, can be eliminated.

As detected bearing temperature is displayed on the display unit and alarm is sounded by the alarm device 6 when the detected bearing temperature exceeds a prescribed permissible temperature, bearing temperature is always monitored and excessive rise of bearing temperature is evaded.

By configuring the bearing device such that the bearing temperature carrying member 11 is moved toward the back metal against the spring force of the spring 13 such that the top end face 11a of the bearing temperature carrying member 11 is level with the sliding surface 2a of the bearing layer 2, the bearing temperature carrying member 11 can be energized toward the bearing layer 2 from the back metal 3 with a proper initial load with a compact construction.

[The Second Embodiment]

Figure 2:
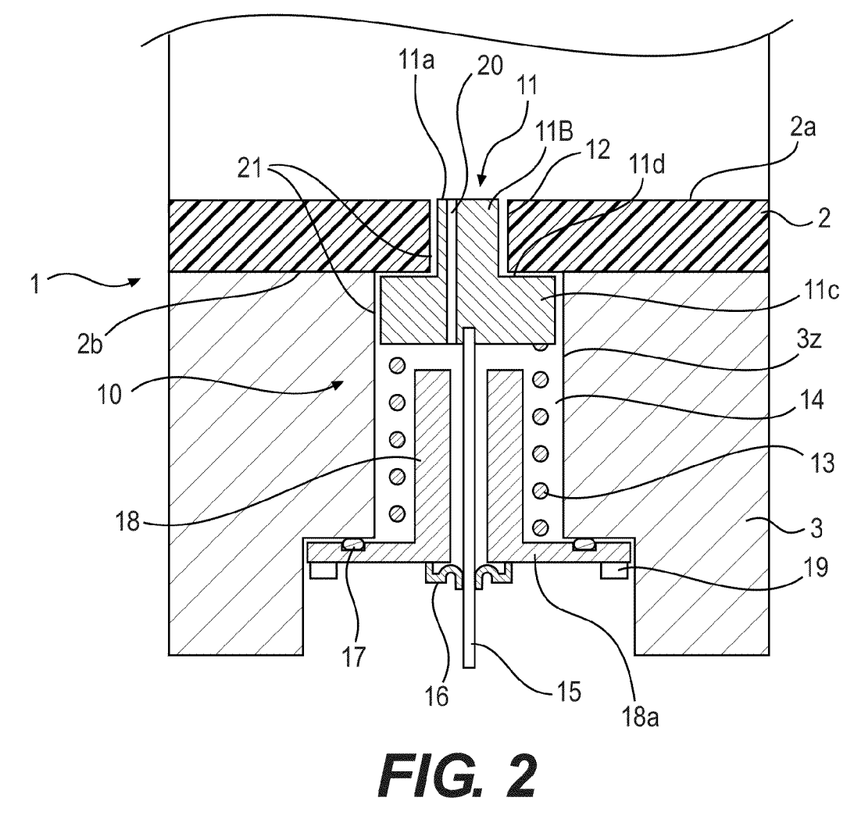
FIG. 2 is a view as in FIG. 1 of a second embodiment of the invention.

FIG. 2 is a view as in FIG. 1 of a second embodiment of the invention.

In the second embodiment, a through hole 20 for pressure balancing is drilled to the bearing temperature carrying member 11 to communicate the top end surface 11a to the spring room 14. Construction other than that is the same as that of the first embodiment and the same constituent parts as those of the first embodiment are indicated by the same reference numerals.

According to the second embodiment, oil on the sliding surface 2a of the bearing layer 2 can be easily conduced to the back side of the bearing temperature carrying member 11 via the through hole 20, and downward force and upward force exerting on the bearing temperature carrying member 11 can be balanced rapidly when bearing load exerting from the top end surface 2a of the bearing temperature carrying member 11, so clearances between the bearing temperature carrying member 11, bearing layer 2, and back metal 3 can be adjusted easily without influenced by oil film pressure in the bearing 1.

[The Third Embodiment]

Figure 3:
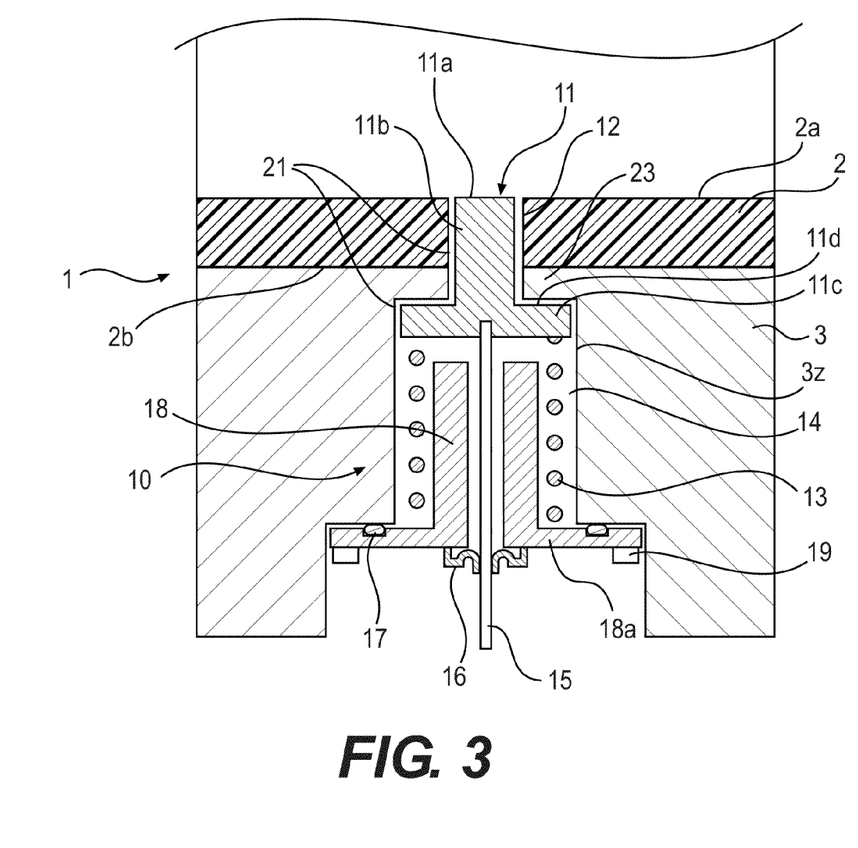
FIG. 3 is a view as in FIG. 1 of a third embodiment of the invention.

FIG. 3 is a view as in FIG. 1 of a third embodiment of the invention.

In the third embodiment, an annular protrusion 23 is formed to the back metal 3 so that the shoulder 11d of the base part 11c for restricting protrusion of the protruded part 11b of the bearing temperature carrying member 11 is allowed to abut on the lower surface of the annular protrusion 23 such that the top end surface 11a does not protrude from the sliding surface 2a of the bearing layer 2.

Construction other than that is the same as that of the first embodiment and the same constituent parts as those of the first embodiment are indicated by the same reference numerals.

According to the third embodiment, energizing force of the spring 13 to push the temperature carrying member 1 toward the sliding surface 2a of the bearing layer 2 is supported by the annular protrusion 23 of the back metal 3, deformation of the surface of bearing layer 2 which may occur due to the energizing force of the spring 13 in the case of the first embodiment in which the energizing force of the spring 13 exerts directly on the back face of the bearing layer 2. Therefore, occurrence of trouble in lubrication of the rotation shaft due to occurrence of irregularity on the surface of the bearing layer can be prevented.

[The Fourth Embodiment]

Figure 4:
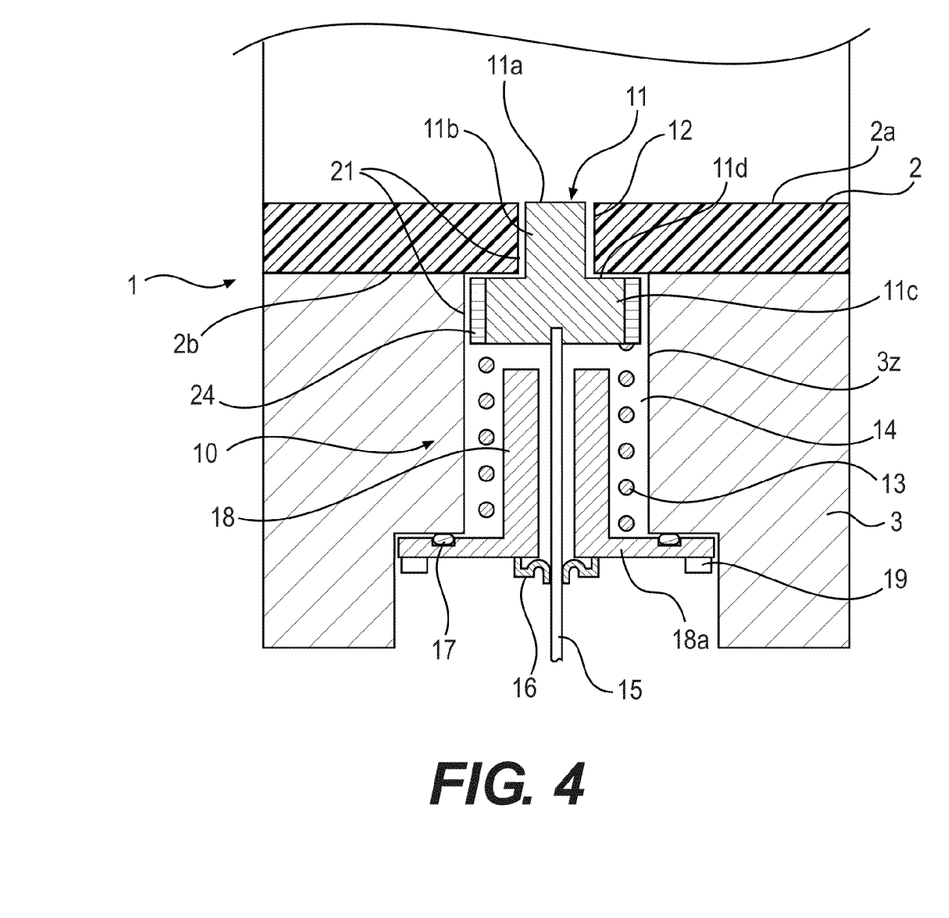
FIG. 4 is a view as in FIG. 1 of a fourth embodiment of the invention.

FIG. 4 is a view as in FIG. 1 of a fourth embodiment of the invention.

In the fourth embodiment, the periphery of the base part 11c of the bearing temperature carrying member 11 is coated with a layer of heat insulating material 24.

Construction other than that is the same as that of the first embodiment and the same constituent parts as those of the first embodiment are indicated by the same reference numerals.

According to the fourth embodiment, transfer of heat from the outer periphery of the base part 11c of the bearing temperature carrying member 11 to the back metal through the minute clearance 21 between the periphery of the base part 11c and the inner periphery of the hole 3z in the back metal 3 is prevented or reduced substantially by coating the outer periphery of the base part 11c with the insulating material 24.

Therefore, decrease in temperature of the bearing temperature carrying member 11 as compared with the temperature of the bearing layer due to the heat dissipation from the temperature carrying member 11 to the back metal 3 is suppressed, and temperature of the bearing temperature carrying member 11 can be maintained at substantially the same as that of the bearing layer, which means bearing temperature can be detected more accurately.

[The Fifth Embodiment]

Figure 5:
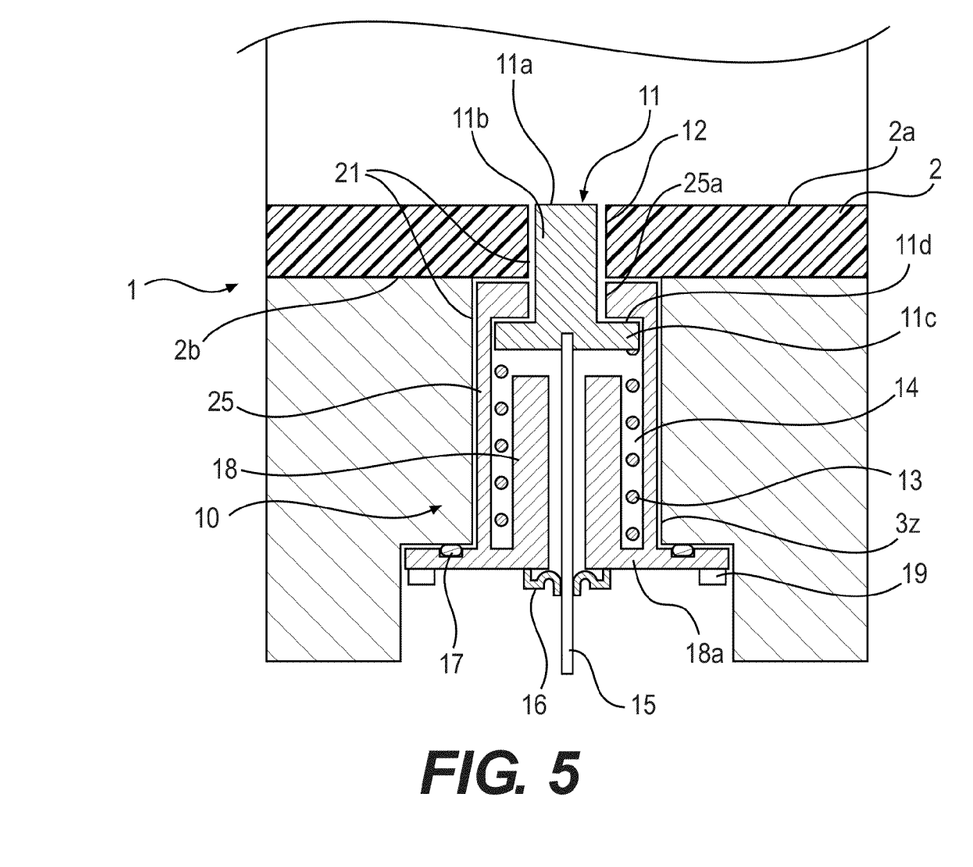
FIG. 5 is a view as in FIG. 1 of a fifth embodiment of the invention.

FIG. 5 is a view as in FIG. 1 of a fifth embodiment of the invention.

In the fifth embodiment, the bearing temperature detecting device 10 is composed as a cartridge-type unit. The cartridge-type bearing temperature detecting unit 10 is composed such that the bearing temperature carrying member 11, the spring 13, and the thermocouple 15 are accommodated in a case 25 made of insulating material and the protruded part 11b of the bearing temperature carrying member 11 penetrates a through hole 25a drilled in the upper part of the case 25 and the through hole 12 of the bearing layer 2. This cartridge-type temperature detecting unit 10 is attached detachably to the back metal by means of a plurality of bolts 19.

Protrusion of the protruded part 11b of the bearing temperature carrying member 11 from the outside face 2b of the bearing layer 2 toward the sliding surface 2a thereof is restricted by allowing the shoulder 11d of the bearing temperature carrying member 11 to abut on the sliding surface of the upper part of the case 25 such that the top end surface 11a does not protrude from the sliding surface 2a of the bearing layer 2.

Construction other than that is the same as that of the first embodiment and the same constituent parts as those of the first embodiment are indicated by the same reference numerals.

According to the fifth embodiment, the temperature detecting device is composed as a cartridge-type unit 10 which is composed of a case 25 made of heat insulating material and having the bearing temperature carrying member 11, the spring 13, and the thermocouple 15 accommodated therein, so heat dissipation from the bearing temperature carrying member 11 to the back metal 3 is suppressed more effectively, and temperature of the bearing temperature carrying member 11 can be maintained at substantially the same as that of the bearing layer, which means bearing temperature can be detected more accurately. Moreover, as the cartridge-type unit 10 can be attached as a bearing temperature measuring unit detachably to the back metal 3, assembling and disassembling of the bearing temperature measuring device 10 can be facilitated.

[The Sixth Embodiment]

Figure 6:
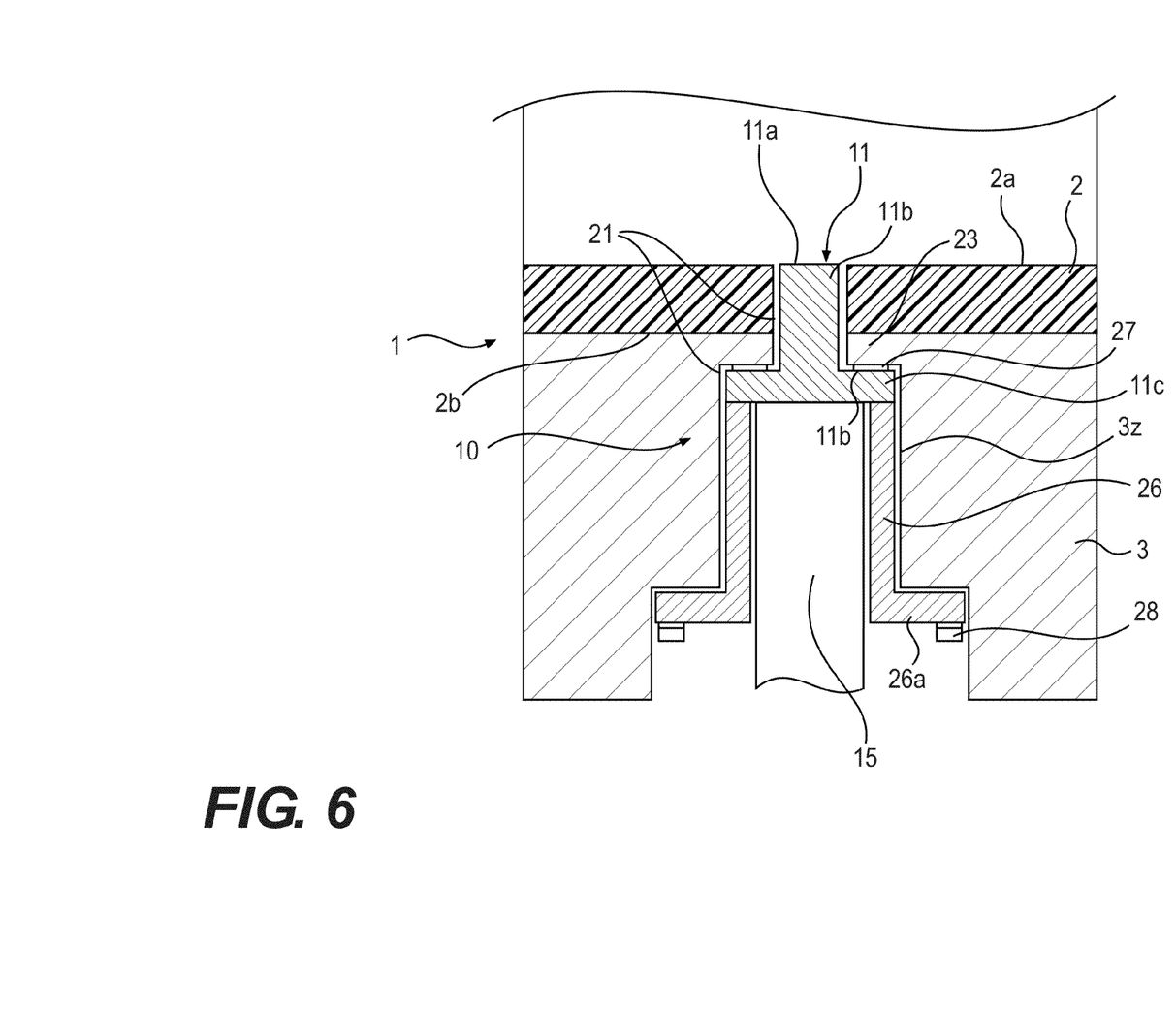
FIG. 6 is a view as in FIG. 1 of a sixth embodiment of the invention.

FIG. 6 is a view as in FIG. 1 of a sixth embodiment of the invention.

In the sixth embodiment, an annular protrusion 23 is formed to the back metal 3 as is in the case of the third embodiment shown in FIG. 3 so that the shoulder 11d of the base part 11c for restricting protrusion of the protruded part 11b of the bearing temperature carrying member 11 is allowed to abut on the lower surface of the annular protrusion 23 such that the top end surface 11a does not protrude from the sliding surface 2a of the bearing layer 2, and a cylindrical sleeve 26 made of elastic material is inserted into the hole 3z in the back metal 3 to support the bearing temperature carrying member 11 in stead of the spring 13 in the third embodiment shown in FIG. 3, the cylindrical sleeve 26 having a flange part 26a with which the sleeve 26 is screw tightened to the back metal by means of a plurality of bolts 28. The bearing temperature carrying member 11 can move downward (toward the back metal 3) when bearing load exerts on the top end surface thereof and the lower end face of the base part 11c thereof presses the top end of the cylindrical part of the elastic sleeve to cause elastic compression deformation of the cylindrical part of the elastic sleeve 26.

In the embodiment, the sleeve 26 attached to the back metal 3 so that the shoulder 11d of the bearing temperature carrying member 11 is allowed to abut on the lower surface of the annular protrusion 23 via the gasket 27 for sealing oil leak from the sliding surface 2a side such that the top end surface 11a does not protrude from the sliding surface 2a of the bearing layer 2.

The thermocouple 15 is located inside the cylindrical sleeve 26.

According to the fifth embodiment, the thermocouple 15 is provided independently of the bearing temperature carrying member 11 and the cylindrical sleeve 26, and radial movement of the bearing temperature carrying member 11 toward the back metal 3 is enabled by elastic compression deformation of the cylindrical sleeve 26, so space for mounting the thermocouple 15 can be increased, and a general-purpose thermocouple can be used and replacement of the thermocouple 15 is achieved with facility.

Construction of the bearing temperature carrying member 11 is the same as that in the first to fifth embodiment and the same portions thereof are indicated by the same reference numeral.

[The Seventh Embodiment]

Figure 7:
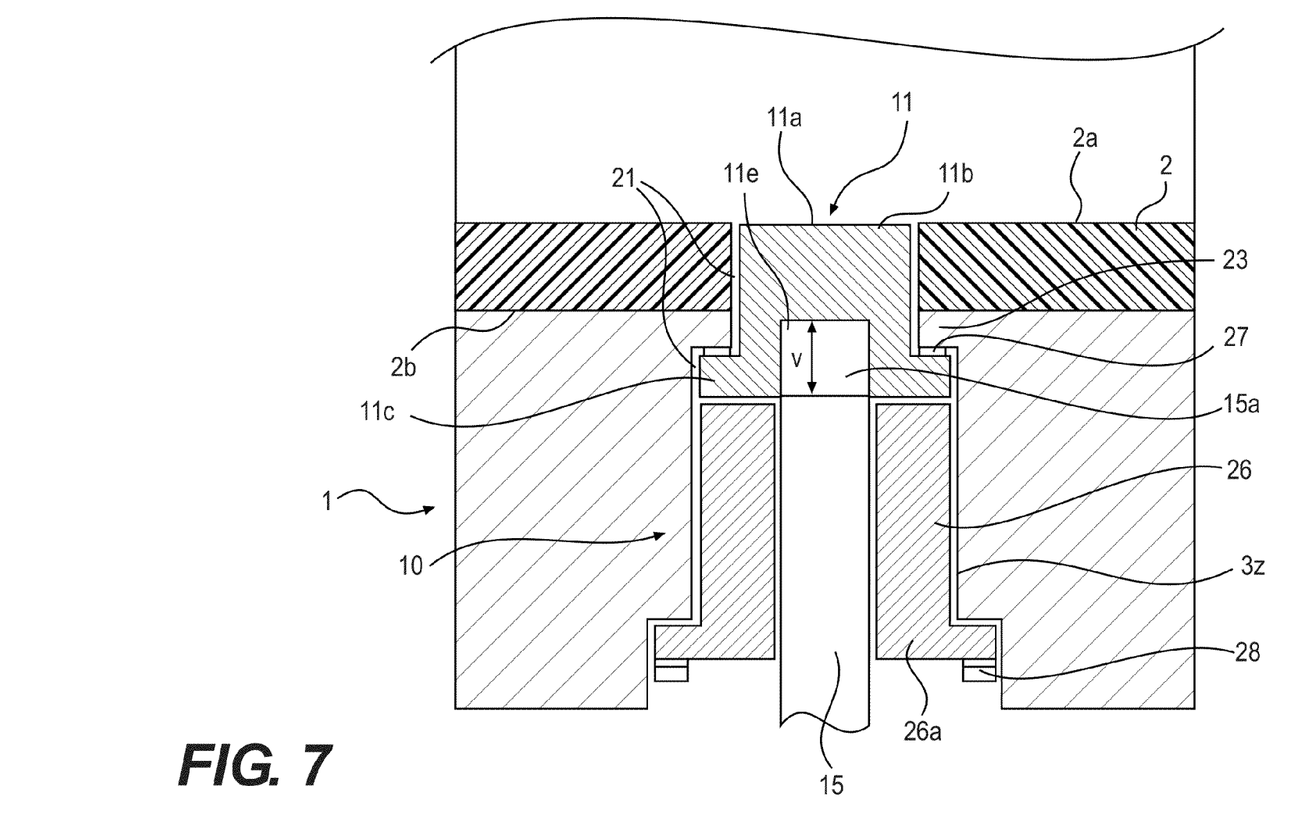
FIG. 7 is a view as in FIG. 6 of a seventh embodiment of the invention.

FIG. 7 is a view as in FIG. 6 of a seventh embodiment of the invention.

In the seventh embodiment, a hole 11e for inserting the thermocouple 15 is provided in the bearing temperature carrying member 11, depth of the hole 11e being V from the lower surface of the base part of the bearing temperature carrying member 11, and the thermocouple 15 is inserted into the hole 11e(reference numeral 15a indicates a inserted portion of the thermocouple).

Construction other than that is the same as that of the fifth embodiment shown in FIG. 6 and the same constituent parts as those of the fifth embodiment are indicated by the same reference numerals.

According to the seventh embodiment, the temperature sensing end of the thermocouple 15 is positioned nearer to the top end surface 11a of the bearing temperature carrying member 11, so bearing temperature can be detected more accurately.

The invention can be applied to a thrust bearing consisting of a plurality of thrust bearing pads each being composed of a bearing layer of resin material and a back metal to which the bearing layer is adhered. For example, a thrust bearing pads composed of a bearing layer and a back metal to which the bearing layer is adhered is provided, in which a cylindrical space for accommodating parts constituting a bearing temperature detecting device is provided in the back metal, a through hole is drilled to penetrate the bearing layer to be connected to the cylindrical space in the back metal, wherein the parts constituting the bearing temperature detecting device includes: a bearing temperature carrying member made of material having a coefficient of thermal conductivity larger than that of the bearing layer and shaped to have a protruded part to be inserted slidably into the through hole in the bearing layer and a base part to be received in the cylindrical space in the back metal, the base part serving to restrict protrusion of the protruded part into the through hole so that the top end surface thereof is level with, and not protrudes from the surface of the bearing layer; a pushing member which is attached to the back metal to push the bearing temperature carrying member so that the protruded part thereof protrudes into the through hole in the bearing layer until the protrusion is restricted by the base member thereof and shrinks to allow the bearing temperature carrying member to move toward the back metal against the pushing force of the pushing member when bearing load exerts on the bearing temperature carrying member; and a temperature sensing member for detecting temperature of the bearing temperature carrying member.

Industrial Applicability

According to the invention, a bearing temperature monitoring device of a bearing composed of a bearing layer of resin material and a back metal to which the bearing layer is adhered, with the device the bearing temperature carrying member made of metal of which the top end surface faces the surface of the rotation shaft supported by the bearing does not cause to scratch the surface of the rotation shaft by composing such that protrusion of the top end surface of the bearing temperature carrying member from the sliding surface of the bearing layer is prevented and as a result occurrence of decrease in load bearing capacity and occurrence of damage to the rotation shaft can be prevented resulting in increased reliability, and a bearing device provided with the monitoring device.

The invention claimed is:

1. A bearing temperature monitoring device comprising:

a bearing layer of resin material;

a back metal adhered to an inner surface of the bearing layer, a cylindrical space being provided in the back metal;

a through hole drilled to penetrate the bearing layer so as to be connected to the cylindrical space in the back metal;

a bearing temperature carrying member made of material having a coefficient of thermal conductivity larger than that of the bearing layer, the bearing temperature carrying member being shaped as a stepped solid cylinder having a cylindrical protruded part which has a top axial end surface inserted slidably into the through hole in the bearing layer, and a cylindrical base part having a bottom axial end surface received in the cylindrical space in the back metal so as to restrict protrusion of the cylindrical protruded part into the through hole such that the top axial end surface of the cylindrical protruded part is level with and does not protrude from an outer sliding surface of the bearing layer, the cylindrical base part having a diameter larger than that of the cylindrical protruded part;

a spring member which is arranged within the cylindrical space in the back metal and is attached to the back metal so as to abut against the bottom axial end surface of the bearing temperature carrying member and press the bearing temperature carrying member so that the cylindrical protruded part thereof protrudes into the through hole in the bearing layer until the protrusion is restricted by the cylindrical base member thereof, and to shrink so as to allow the bearing temperature carrying member to move toward the back metal against a pushing force of the spring member when a bearing load is exerted on the bearing temperature carrying member;

a temperature sensing member connected to the bearing temperature carrying member for detecting a temperature of the bearing temperature carrying member, wherein the bearing temperature carrying member is configured to form a clearance between an outer periphery of the cylindrical protruded part and an inner periphery of the through hole, and to form a clearance between an outer periphery of the cylindrical base part and an inner periphery of the cylindrical space, such that the top axial end surface of the cylindrical protruded part of the the bearing temperature carrying member is in communication with the bottom axial end surface of the cylindrical base part of the bearing temperature carrying member in the cylindrical space via the clearances, so that pressure exerted on the top axial end surface of the cylindrical protruded part of the bearing temperature carrying member and on the bottom axial end surface of the cylindrical base part of the bearing temperature carrying member is balanced via the clearances;

a bearing temperature processing device for calculating a bearing temperature by processing an electric signal of temperature detected by the temperature sensing member;

a display unit for displaying the temperature calculated by the bearing temperature processing device; and an alarm device for raising alarm when the calculated bearing temperature exceeds a prescribed permissible temperature.

2. A bearing temperature monitoring device according to claim 1, further comprising:

a cover member for supporting the spring member while covering the cylindrical space in the back metal, wherein the through hole in the bearing layer is smaller in diameter than the cylindrical space in the back metal so that a flat step is formed between the through hole in the bearing layer and the cylindrical space in the back metal, and the bearing temperature carrying member is shaped such that protrusion of the cylindrical protruded part into the through hole is restricted by the cylindrical base part by abutting of the cylindrical base part on the flat step between the through hole in the bearing layer and the cylindrical space.

3. A bearing temperature monitoring device according to claim 2, wherein a through hole is drilled through to the bearing temperature carrying member to penetrate from the top axial end surface of the cylindrical protruded part thereof to the bottom axial end surface of the cylindrical base part thereof for balancing pressure exerting on the bearing temperature carrying member.

4. A bearing temperature monitoring device according to claim 1, further comprising:

a cover member for supporting the spring member while covering the cylindrical space in the back metal, wherein the cylindrical space in the back metal is shaped such that an end of the cylindrical space in the back metal does not reach the bearing layer, thereby leaving an annular protrusion of the back metal adjacent the bearing layer to form a through hole in the back metal which continues to the through hole in the bearing layer, the through hole being smaller in diameter than the cylindrical space so that a flat step is formed between the through hole in the back metal and the cylindrical space in the back metal, and the bearing temperature carrying member is shaped such that protrusion of the cylindrical protruded part into the through hole is restricted by the cylindrical base part by abutting of the cylindrical base part on the flat step between the through hole in the back metal and the cylindrical space in the back metal.

5. A bearing temperature monitoring device according to claim 1, wherein the through hole is smaller in diameter than the cylindrical space in the back metal so that a flat step is formed between the through hole and the cylindrical space, and the bearing temperature carrying member is shaped such that protrusion of the cylindrical protruded part into the through hole is restricted by the cylindrical base part by abutting of the cylindrical base part on the flat step between the through hole in the bearing later and the cylindrical space in the back metal or on the through hole in the back metal and the cylindrical space in the back metal, and wherein the outer periphery of the cylindrical base part of the bearing temperature carrying member is coated with heat insulating material in order to suppress heat transfer from the temperature carrying member to the back metal.

6. A bearing temperature monitoring device according to claim 1, wherein the bearing temperature monitoring device comprises a cartridge-shaped temperature detecting unit attached detachably to the back metal, the unit comprising a substantially cylindrical case made of heat insulating material in which the cylindrical base part of the bearing temperature carrying member is received with the cylindrical protruded part protruding from a through hole at the top of the case, and the spring member located inside the case to energize the bearing temperature carrying member to allow the cylindrical protruded part to protrude from the through hole, wherein the unit is attached to the back metal such that the cylindrical protruded part of the bearing temperature carrying member protrudes into the through hole in the bearing layer.

7. A bearing temperature monitoring device according to claim 1, wherein the through hole in the bearing layer is smaller in diameter than the cylindrical space in the back metal so that a flat step is formed between the through hole in the bearing layer and the cylindrical space in the back metal, wherein the spring member comprises a substantially cylindrical elastic sleeve of which a lower end which is formed into a flange which is fixed to the back metal so that an upper end of the elastic sleeve pushes the bearing temperature carrying member with elastic force due to compression deformation of the elastic sleeve fixed to the back metal and the bearing temperature carrying member can move toward the back metal against the elastic force when a bearing load is exerted on the top axial end surface of the cylindrical protruded part of the bearing temperature carrying member, and wherein the temperature sensing member is inserted in a hollow of the substantially cylindrical sleeve.

8. A bearing temperature monitoring device according to claim 7, wherein a hole having a bottom is bored into the bearing temperature carrying member from a surface contrary to the top axial end surface of the cylindrical protruded part so that the bottom of the hole reaches near the top axial end surface, and wherein the temperature sensing member is inserted into the hole.

9. A bearing device, comprising:

a bearing layer of resin material;

a back metal adhered to an inner surface of the bearing layer, wherein a cylindrical space is provided in the back metal;

a through hole drilled to penetrate the bearing layer so as to be connected to the cylindrical space in the back metal;

a bearing temperature carrying member made of material having a coefficient of thermal conductivity larger than that of the bearing layer, the bearing temperature carrying member being shaped as a stepped solid cylinder having a cylindrical protruded part which has a top axial end surface slidably inserted into the through hole in the bearing layer, and a cylindrical base part having a bottom axial end surface received in the cylindrical space in the back metal so as to restrict protrusion of the cylindrical protruded part into the through hole such that the top axial end surface of the cylindrical protruded part is level with and does not protrude from an outer sliding surface of the bearing layer;

a spring member which is arranged within the cylindrical space in the back metal and is attached to the back metal so as to abut against the bottom axial end surface of the bearing temperature carrying member and press the bearing temperature carrying member so that the cylindrical protruded part thereof protrudes into the through hole in the bearing layer until the protrusion is restricted by the cylindrical base member thereof, and to shrink so as to allow the bearing temperature carrying member to move toward the back metal against a pushing force of the spring member when a bearing load is exerted on the bearing temperature carrying member; and a temperature sensing member connected to the bearing temperature carrying member for detecting a temperature of the bearing temperature carrying member, wherein the bearing temperature carrying member is arranged to form a clearance between an outer periphery of the cylindrical protruded part and an inner periphery of the through hole, and to form a clearance between an outer periphery of the cylindrical base part and an inner periphery of the cylindrical space, such that the top axial end surface of the cylindrical protruded part of the bearing temperature carrying member is in communication with the bottom axial end surface of the cylindrical base part of the bearing temperature carrying member in the cylindrical space, so that pressure exerted on the top axial end surface of the cylindrical protruded part of the bearing temperature carrying member and on the bottom axial end surface of the cylindrical base part of the bearing temperature carrying member is balanced via the clearances.

10. A journal bearing device for supporting rotation shafts rotating at high rotation speed of steam turbines and gas turbines via oil film, wherein the journal bearing device includes the bearing device according to claim 9.

11. A bearing device according to claim 9, wherein the bearing device is a thrust bearing which includes a slidingly contacted member having a sliding surface perpendicular to a thrust direction, and thrust bearing pads that contact the sliding surface via an oil film, wherein the back metal is provided at a rear side of the thrust bearing pads.

12. A bearing device according to claim 9, further comprising:
a bearing temperature processing device for calculating a bearing temperature by processing an electric signal of temperature detected by the temperature sensing member;
a display unit for displaying the temperature calculated by the bearing temperature processing device; and
an alarm device for raising alarm when the calculated bearing temperature exceeds a prescribed permissible temperature.

13. A bearing device according to claim 9, further comprising:
a cover member for supporting the spring member while covering the cylindrical space in the back metal,
wherein the through hole in the bearing layer is smaller in diameter than the cylindrical space in the back metal so that a flat step is formed between the through hole in the bearing layer and the cylindrical space in the back metal, and the bearing temperature carrying member is shaped such that protrusion of the cylindrical protruded part into the through hole is restricted by the cylindrical base part by abutting of the cylindrical base part on the flat step between the through hole in the bearing layer and the cylindrical space.

14. A bearing device according to claim 13, wherein a through hole is drilled through to the bearing temperature carrying member to penetrate from the top axial end surface of the cylindrical protruded part thereof to the bottom axial end surface of the cylindrical base part thereof for balancing pressure exerting on the bearing temperature carrying member.

15. A bearing device according to claim 9, further comprising:
a cover member for supporting the spring member while covering the cylindrical space in the back metal,
wherein the cylindrical space in the back metal is shaped such that an end of the cylindrical space in the back metal does not reach the bearing layer, thereby leaving an annular protrusion of the back metal adjacent the bearing layer to form a through hole in the back metal which continues to the through hole in the bearing layer, the through hole being smaller in diameter than the cylindrical space so that a flat step is formed between the through hole in the back metal and the cylindrical space in the back metal, and the bearing temperature carrying member is shaped such that protrusion of the cylindrical protruded part into the through hole is restricted by the cylindrical base part by abutting of the cylindrical base part on the flat step between the through hole in the back metal and the cylindrical space in the back metal.

16. A bearing device according to claim 9, wherein the through hole is smaller in diameter than the cylindrical space in the back metal so that a flat step is formed between the through hole and the cylindrical space, and the bearing temperature carrying member is shaped such that protrusion of the cylindrical protruded part into the through hole is restricted by the cylindrical base part by abutting of the cylindrical base part on the flat step between the through hole in the bearing later and the cylindrical space in the back metal or on the through hole in the back metal and the cylindrical space in the back metal, and wherein the outer periphery of the cylindrical base part of the bearing temperature carrying member is coated with heat insulating material in order to suppress heat transfer from the temperature carrying member to the back metal.

17. A bearing device according to claim 9, wherein the bearing temperature detecting device comprises a cartridge-shaped temperature detecting unit attached detachably to the back metal, the unit comprising a substantially cylindrical case made of heat insulating material in which the cylindrical base part of the bearing temperature carrying member is received with the cylindrical protruded part protruding from a through hole at the top of the case, wherein the spring member is located inside the case to energize the bearing temperature carrying member to allow the cylindrical protruded part to protrude from the through hole, and wherein the unit is attached to the back metal such that the cylindrical protruded part of the bearing temperature carrying member protrudes into the through hole in the bearing layer.

18. A bearing device according to claim 9, wherein the through hole in the bearing layer is smaller in diameter than the cylindrical space in the back metal so that a flat step is formed between the through hole in the bearing layer and the cylindrical space in the back metal, wherein the spring member comprises a substantially cylindrical elastic sleeve of which a lower end which is formed into a flange which is fixed to the back metal so that an upper end of the elastic sleeve pushes the bearing temperature carrying member with elastic force due to compression deformation of the elastic sleeve fixed to the back metal and the bearing temperature carrying member can move toward the back metal against the elastic force when a bearing load is exerted on the top axial end surface of the cylindrical protruded part of the bearing temperature carrying member, and wherein the temperature sensing member is inserted in a hollow of the substantially cylindrical sleeve.

19. A bearing device according to claim 18, wherein a hole having a bottom is bored into the bearing temperature carrying member from a surface contrary to the top axial end surface of the cylindrical protruded part so that the bottom of the hole reaches near the top axial end surface, and wherein the temperature sensing member is inserted into the hole.

* * * * *